United States Patent
Foster et al.

(10) Patent No.: US 8,947,546 B2
(45) Date of Patent: Feb. 3, 2015

(54) APPARATUS, AND ASSOCIATED METHOD, FOR STABILIZING A VIDEO SEQUENCE

(75) Inventors: Brett Stuart Foster, Cupertino, CA (US); Bryan Andrew Krawetz, Kitchener (CA); Mark David Rushby, Cupertino, CA (US); Gael Jaffrain, Saint Jacobs (CA); Sung Ho Hong, Waterloo (CA); Joshua Lucien Daigle, Waterloo (CA); Gang Xue, Waterloo (CA)

(73) Assignee: BlackBerry Limited, Waterloo (CA)

(*) Notice: Subject to any disclaimer, the term of this patent is extended or adjusted under 35 U.S.C. 154(b) by 368 days.

(21) Appl. No.: 13/411,825

(22) Filed: Mar. 5, 2012

(65) Prior Publication Data

US 2012/0281106 A1 Nov. 8, 2012

Related U.S. Application Data

(60) Provisional application No. 61/478,494, filed on Apr. 23, 2011.

(51) Int. Cl.
*H04N 5/228* (2006.01)
*H04N 5/232* (2006.01)
*H04N 1/00* (2006.01)
*H04N 101/00* (2006.01)

(52) U.S. Cl.
CPC ....... *H04N 5/23267* (2013.01); *H04N 5/23254* (2013.01); *H04N 1/00307* (2013.01); *H04N 2101/00* (2013.01)
USPC .................. 348/208.12; 348/208.99

(58) Field of Classification Search
USPC ........................ 348/208.12, 208.99
See application file for complete search history.

(56) References Cited

U.S. PATENT DOCUMENTS

| | | | |
|---|---|---|---|
| 5,712,474 A | 1/1998 | Naneda | |
| 2006/0158524 A1* | 7/2006 | Yang et al. | 348/208.6 |
| 2009/0153680 A1 | 6/2009 | Shibata | |
| 2009/0244301 A1* | 10/2009 | Border et al. | 348/208.99 |
| 2011/0050919 A1* | 3/2011 | Albu et al. | 348/208.6 |

FOREIGN PATENT DOCUMENTS

EP 0649256 A2 4/1995

OTHER PUBLICATIONS

Toshiro Kinugasa et al: "Electronic Image Stabilizer for Video Camera Use", IEEE Transactions on Consumer Electronics, IEEE Service Center, New York, NY, US, vol. 36, No. 3, Aug. 1, 1990, pp. 520-524, XP000162884.

(Continued)

*Primary Examiner* — Anthony J Daniels
(74) *Attorney, Agent, or Firm* — The Danamraj Law Group, P.C.

(57) ABSTRACT

An apparatus, and an associated method, for facilitating stabilization of a recorded video sequence, formed of captured image frames. Captured image frames are cropped by a frame cropper. Cropping of an image is dependent upon lighting conditions. Upon the occurrence of a low-light, lighting condition, the amount of cropping is altered. And, when acceptable lighting conditions return, the amount of cropping is again altered, all in a manner to facilitate video stabilization.

11 Claims, 4 Drawing Sheets

(56) References Cited

OTHER PUBLICATIONS

Kenya Uomori et al: "Automatic Image Stabilizing System by Full-Digital Signal Processing", IEEE Transactions on Consumer Electronics, IEEE Service Center, New York, NY, US, vol. 36, No. 3, Aug. 1, 1990, pp. 510-519, XP000162883.

Yong Chul Park et al: "An Adaptive Motion Decision System for Digital Image Stabilizer Based on Edge Pattern Matching", Consumer Electronics, 1992. Digest of Technical Papers, ICCE., IEEE 1992 International Conference on Rosemont, IL, USA, Jun. 2-4, 1992, New York, NY, USA, IEEE, US, Jun. 2, 1992, pp. 318-319, XP010102899.

* cited by examiner

APPARATUS, AND ASSOCIATED METHOD, FOR STABILIZING A VIDEO SEQUENCE

CROSS-REFERENCE OF RELATED APPLICATION

The present application claims priority to U.S. Provisional application Ser. No. 61/478,494 filed on Apr. 23, 2011, the contents of which are incorporated herein by reference.

The present disclosure relates generally to a manner by which to facilitate image stabilization of a video sequence formed of a plurality of captured image frames. More particularly, the present disclosure relates to an apparatus, and an associated method, by which to carry out image stabilization in low-light conditions.

BACKGROUND

Many new electronic devices have been developed in recent years as a result of advancements in technology. Such devices include devices that provide new functions and services and also devices that provide improved operability of existing functions and services.

For instance, advancements in communication technologies have permitted the development and deployment of new communication devices, equipment, and communication infrastructures that provide for communications using the communication devices and equipment. Use of such new devices has changed the lives and daily habits of many.

Wireless communication systems, such as cellular, WiFi, and other analogous radio systems, are exemplary of communication systems that include, or are based upon, advancements in communication technologies. Such systems have achieved significant levels of usage. And, with additional technological capabilities along with decreasing equipment and operational costs, increased communication capabilities, at lowered costs, is, and shall likely continue to be, provided. Successive generations of wireless communication systems have been developed and deployed. For instance, early-generation, cellular communication systems that were first installed provided primarily for voice communications and provided only limited data communications. Successor-generation, cellular communication systems provided increasingly data-intensive communication capabilities. And, new-generation, cellular communication systems provide for highly data-intensive communication services as well as improved interoperability with other types of communication systems.

Communications made by way of cellular, and other analogous, radio communication systems, are typically made through use of portable wireless devices. The portable wireless devices are typically of dimensions and weights permitting the devices easily to be hand carried and, e.g., stored in a shirt pocket or purse when not in use. A wireless device is thereby likely readily to be available for use whenever needed.

A wireless device includes radio transceiver circuitry that transceives communication signals to permit both the reception and transmission of information. Wireless devices are sometimes provided with additional functionality, both communication-related functionality and other functionality. The additional functionality is sometimes associated with processing functions that provide for the manipulation of data. When so-configured, the wireless device forms a multi-functional device, having multiple functionalities.

An exemplary functionality sometimes provided to a wireless device is a camera functionality. A camera functionality provides for the capture and recordation of a photographic image. Camera functionality is, of course, also provided in a standalone device, such as a conventional digital camera or video recorder or analogous device. Typically, the camera functionality, when provided to a wireless device, does not require significant, if any, increase in the physical dimensional requirements of the device. And, when embodied at, and forming a portion of, a wireless device, the camera functionality is also readily available to a user when the wireless device is hand-carried, or otherwise carried by or in proximity to, the user.

In typical operation, the camera functionality is provided, in part, by a camera lens assembly that provides for the storage of an image of a subject that is then stored, e.g., as a digital file at a digital storage element. Functionality of the wireless device also sometimes provides for the sending, or other transfer, of the recorded image, such as by a digital-file representation of the image to a data message and sending the file to a remote location.

A video sequence, i.e., a "video", is formed of a sequence of captured, image frames. If the camera at which the image frames of the video sequence are captured is not precisely supported, camera shake, i.e., light movement of the camera during image capture, might result in visible jitter.

Video stabilization is sometimes provided to compensate for the jitter. However, conventional video stabilization schemes are not fully beneficial. And, in some situations, such as low-light, lighting conditions, the conventional video stabilization sometimes is even counterproductive.

An improvement to the existing state of the art would therefore be beneficial. It is in light of this background information related to devices capable of forming video sequences that the significant improvements of the present disclosure have evolved.

DETAILED DESCRIPTION

Figure 1:
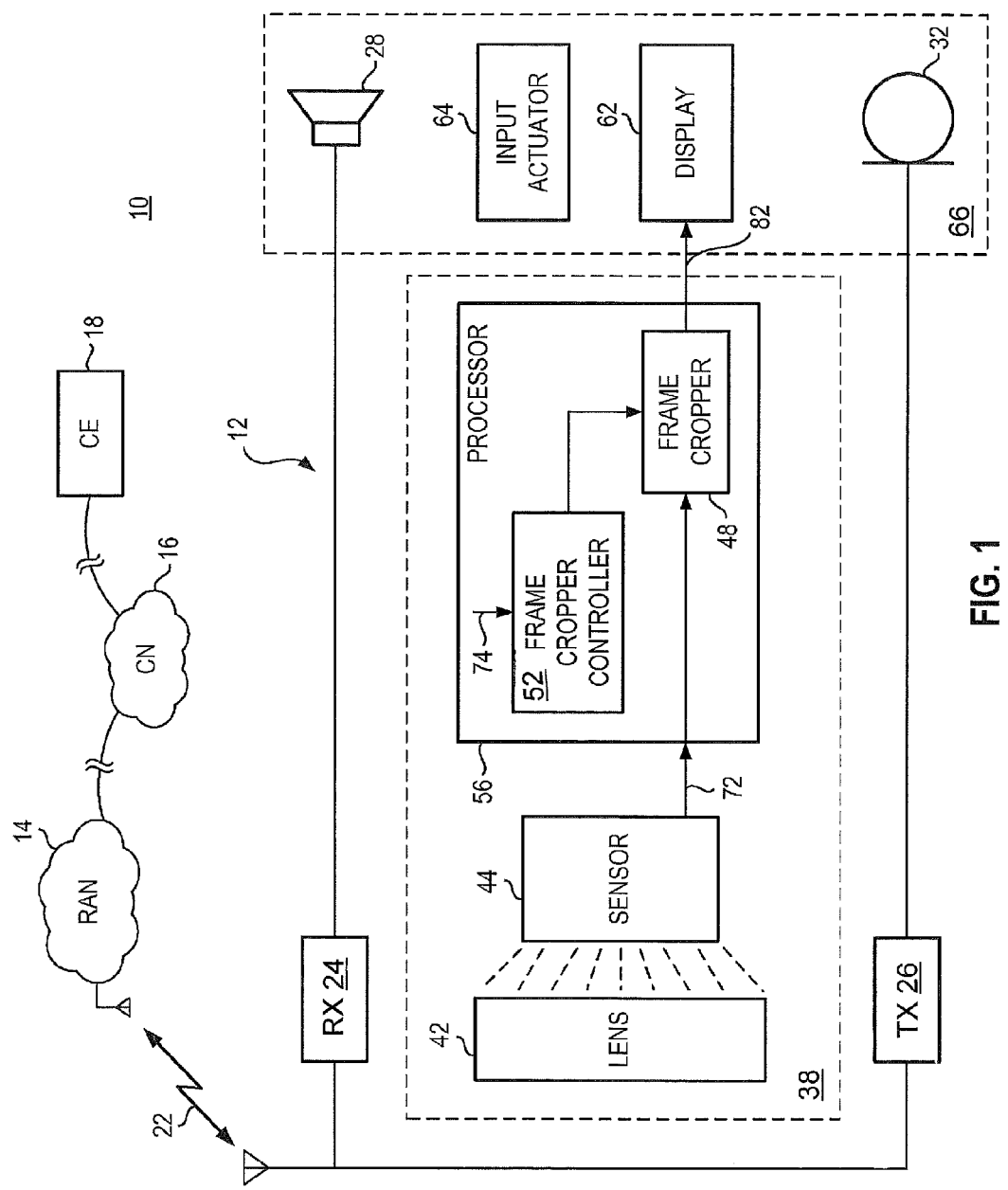
FIG. 1 illustrates a functional block diagram of a communication system in which an embodiment of the present disclosure is operable.

The present disclosure, accordingly, advantageously provides an apparatus, and an associated method, by which to facilitate image stabilization of a video formed of a plurality of captured image frames.

Through operation of an implementation of the present disclosure, a manner is provided by which to carry out image stabilization over a range of lighting conditions, including in low-light conditions. More generally, through operation of an implementation of the present disclosure, a manner is provided to carry out image stabilization over a range of sensor gains of a sensor that provides captured image frames.

In one aspect of the present disclosure, image stabilization is provided through use of cropping of perimeter portions of captured image frames. When an image frame is captured in a low-light, lighting condition, cropping of the frames is altered. Alteration in the cropping of the image frames is gradual, and the resultant, stabilized video sequences, when viewed or otherwise played out, appear to be smooth, with gradual transition between adjacent image frames of the video. Problems associated with conventional video-sequence stabilization in low-light, lighting conditions are alleviated.

In one implementation of the present disclosure, the image frames are captured by a camera, captured, e.g., at a rate permitting formation of a video sequence. A light condition indication is also provided. The light condition indication is indicative of at least a low-light, lighting condition. Indications of the image frames of the image frames and indications of the lighting conditions are provided, e.g., by a CMOS (Complementary Metal Oxide Semiconductor) sensor.

In another aspect of the present disclosure, the indications of the captured image frames and of the lighting conditions are provided to a signal processor. The captured image frames are of captured-image dimensions, i.e., of a number of pixels in both the horizontal and vertical dimensions that correspond to, or are related to, the number of sensors of the sensor that senses and captures images.

In another aspect of the present disclosure, an image frame cropper, such as an image frame cropper embodied at a signal processor and formed of executable code, crops the captured image frame to form a cropped image frame. Cropping of the captured image frame crops at least part of an outer perimeter portion of the image frame. Cropping is performed, e.g., to form a smaller frame by removing or otherwise not including the outer perimeter portion, such as an outer 5% or 10%, of the captured image frame.

In another aspect of the present disclosure, motion vectors are generated that define a cropping window that is determinative of the cropping of the captured image frame. The motion vector is a magnitude and direction value that is, e.g., represented in terms of pixel offsets from a center location.

In another aspect of the present disclosure, the motion vectors are of values that crop a designated portion of the captured image frames captured during normal lighting conditions.

In another aspect of the present disclosure, upon detection of a low-light, lighting condition, cropping of the captured image frame or frames, captured in the low-light lighting condition, is altered. Video stabilization often times is counterproductive when the images have been captured in low-light, lighting conditions. When a low-light, lighting condition is indicated with respect to a captured image, the motion vector that is determinative of the cropping window is reduced, such as to a null value. The motion vector is stabilized.

In another aspect of the present disclosure, upon detection of a high sensor gain condition, cropping of the captured image frame or frames is altered. Video stabilization often times is counterproductive when the images have been captured when the sensor exhibits high gain, i.e., greater than a threshold. When the sensor exhibits high gain, i.e., is greater than a threshold, such a condition is indicated with respect to a captured image, the motion vector that is determinative of the cropping window is reduced, such as to a null value. The motion vector is stabilized, as a result, at a center point.

In another aspect of the present disclosure, the reduction in the motion vector upon detection of the low-light condition associated with a captured image frame is not immediately carried out. Rather, the reduction in the motion vector is carried out gradually. That is to say, the motion vector is gradually repositioned to the reduced or null value over a group of frames, such as four or five captured image frames. The gradual reduction is implemented, for instance, by utilizing one or more intermediate motion vectors to provide the cropping window during the gradual, interim extending between the initial motion vector and the reduced-size, i.e., desired, motion vector. By gradually repositioning the vector and, hence, gradually altering the cropping that is performed upon the captured image, the gradual, rather than abrupt, change provides for a smoother video sequence even in low-light conditions.

In another aspect of the present disclosure, when the light conditions improve, to be at least an acceptable level, the cropping that is performed upon the captured image is gradually changed. The change is not abrupt, but rather is implemented gradually over several captured image frames.

In these and other aspects, therefore, an apparatus, and an associated method, is provided for facilitating formation of a video sequence formed of a plurality of captured image frames. An image frame cropper is configured to crop a perimeter portion of a captured image frame of the plurality of captured image frames to form a cropped image frame. A controller is configured to control cropping of the captured image frame by the image frame cropper. Cropping of the captured image frame is dependent upon lighting conditions associated with the captured image frame.

Turning first to FIG. 1, a communication system 10 provides for communications with wireless devices, such as the wireless device 12. The communication system 10, in one exemplary implementation, comprises a cellular communication system or other analogous communication system that provides for communications with wireless devices. The following description shall describe exemplary operation of an implementation of the present disclosure with respect to the communication system 10 implemented as a cellular, or cellular-like, communication system, the communication system is also representative of any of various other communication systems, both wireless communication systems and wire line communication systems.

Additionally, while the device 12 forms a communication device in the exemplary implementation shown in FIG. 1, in other implementations, the device 12 is implemented in other manners.

For instance, in an other implementation, the device forms a standalone device that includes the functionality of an implementation of the present disclosure. For instance, in an alternate implementation, the functionality of an implementation of the present disclosure is implemented at a device that does not include separate communication capability. An exemplary standalone device comprises, for instance, a standalone, digital camera.

The communication system 10 includes a network part, here including a radio access network (RAN) 14 and a core network (CN) 16. Communication devices are placeable in communication connectivity with the core network. The communication endpoint 18 is representative of a communication device placeable in communication connectivity with the core network and, in turn, the radio access network 14. A radio air interface upon which radio channels 22 are defined is formed between the network part and the device 12.

The device 12 includes transceiver circuitry having a receive part 24 and a transmit part 26. Received information, received at the receive part includes information that is converted into human perceptible form at a user interface element, such as the speaker 28. And, information sourced at the device 12 is converted into electrical form, here by way of a microphone 32. The receive part 24 is configured to receive and to operate upon information, such as information sent by the communication endpoint 18 to the device 12. And, the transmit part 26 is configured to transmit information to a communication endpoint, such as the communication endpoint 18. For instance, information sourced at the device 12, such as by way of the microphone 32, is transmitted by the transmit part 26 upon radio channels 22 defined on the radio air interface formed between the network part and the radio device, and routed through the radio access network 14 and core network 16 for delivery to the communication endpoint 18. And, information sourced at the communication endpoint 18 is routed through the network part, the core network 16, and the radio access network 14, and sent on radio channels 22 defined upon the radio air interface for delivery to the wireless device 12 and reception at the receive part 24.

The device 12, in the exemplary implementation, is of compact dimensions, readily hand-carriable by a user, thereby to be available when needed.

The device 12 further includes apparatus 38 of an implementation of the present disclosure. The apparatus provides camera functionality capable of capturing, i.e., recording, images at a rate permitting play out of the captured images at a rate to form a video sequence. The apparatus 38 is functionally represented, implementable in any desired manner, including hardware elements, firmware elements, algorithms forming code executable by processing circuitry, and combinations thereof.

The functionality forming the camera includes a camera lens assembly 42, a sensor assembly 44, an image frame cropper 48, and a frame-cropper controller 52. The cropper and controller 48 and 52 are, in the exemplary implementation, embodied at a processor 56. The processor is representative of both an ISP (Image Signal Processor) and a baseband processor. The display 62, input actuators 64, speaker 28, and microphone 32 form the user interface 66 of the device 12.

The camera functionality is operable to capture image frames forming a video sequence responsive to instructions entered by a user of the device 12. In typical operation, the user of the device elects to record a video of a subject and positions the device so that the subject is within the view of the lens 42 of the lens assembly. And, the user causes recording to commence, such as through appropriate input actuation of an input actuator 64. The camera functionality of the apparatus 38 commences recording operation by capturing images of the subject. The lens of the lens assembly 42 causes focusing of received light energy so that the received light energy is incident upon sensors of the sensor assembly 44. The sensor assembly generates an electrical representation, here on the line 72, that is representative of the sensed information and, hence, representative of a captured image. The image, i.e., the captured image frame, is provided to the image frame cropper 48.

The image frame cropper operates to crop the provided image frame, such as by cropping at least parts of the perimeter portion of the captured image frame. In exemplary operation, 5% or 10% captured image frame is cropped. As mentioned previously, cropping is performed to facilitate image stabilization of the resultant video sequence of which each captured image frame of a successive group, i.e., plurality, of captured image frames forms a portion.

A sensor gain indication is provided, here indicated by way of the line 74, to the frame-cropper controller 52. The sensor gain indication is representative of a lighting condition. In one implementation, the functionality of the controller 52 is implemented at both an ISP and at a baseband controller. And the functionality of the cropper 48 is implemented at a baseband processor. When the indication is indicative of an acceptable light level, then the controller causes operation of the frame cropper to crop the selected perimeter portions of image frames provided thereto on the line 72. Lines 72 and 74 are physically implemented, e.g., by a bus, either an internal bus or an external bus, depending upon the device implementation and configuration. However, if the indication is indicative of a low-light, lighting condition, then the frame-cropper controller causes alteration in the operation of the frame cropper 48. Motion vectors, which are determinative of the operation of the frame cropper, are caused to be altered. And, here, the motion vector is reduced, e.g., to a null value. And, the frame cropping is caused to conform to the reduced-value or null-valued motion vector. In the exemplary implementation, when of the null value, frame cropping results in a cropped image that is centered close to, or at, the center point of the captured image frame. When lighting conditions return to an acceptable level, further alteration is made and, e.g., the motion vector provided to the frame cropper 48 is again altered, e.g., also gradually over several frames. By increasing the motion vector gradually, the resultant change in cropping is gradually implemented, facilitating a smooth transition to the change in the cropping.

In one implementation, the value of the vector is not abruptly changed from the initial vector value to the final, null or other reduced-value or when the value is changed from a null, or other reduced-value, to a greater value. Rather, the vector is changed gradually over several frames, such as over four or five frames. Thereby, the change in the cropping is gradual and not abrupt.

The resultant frames, once operated upon by the frame cropper 48 are provided on the line 82 available for play out at the user display 62 or storage at a storage element (not shown in FIG. 1).

Figure 2:
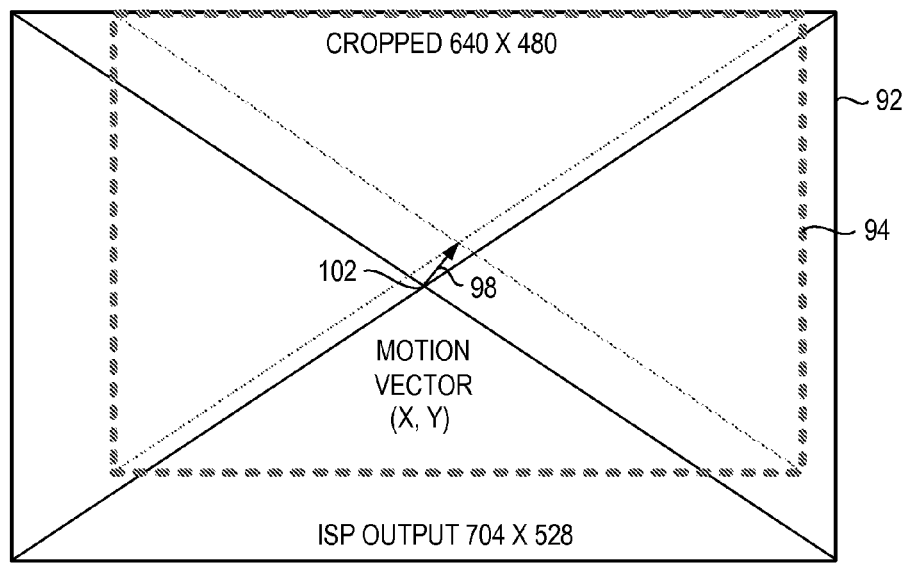
FIG. 2 illustrates a representation of an exemplary, initial motion vector and associated, captured and cropped image frame, respectively.

FIG. 2 illustrates a representation of a captured image frame 92 and a cropped image frame 94 generated during operation of the apparatus 38, shown in FIG. 1. The captured image frame 92 is larger than the cropped image frame 94. In the exemplary representation of FIG. 2, the image frame 92 is of a pixel size of 704 by 528. And, the cropped frame 94 is of a pixel size of 640 by 480 pixels.

A motion vector 98, having magnitude and directional components is also shown. The motion vector is represented, for instance, in terms of a pixel offset from a frame center point 102. The frame center point 102 is the center of the captured image frame 92. The motion vector having values (x,y) is determinative of the cropping that is performed to form the cropped frame 94. The value of the motion vector is determinative of the cropping that is performed upon the input image frame 92 form the cropped frame.

In one implementation, the motion vector is of an x-direction value of [−32,+32], and the motion vector has a value in the y-direction of [−24,+24], within about 5%. The motion vector comprises, for instance, a signed offset from the center 102.

In another exemplary representation, the captured image frame 92 is 1,100 by 600 and the cropped output is 1000 by 500. In this example, in normal operation, i.e., acceptable lighting conditions, a crop vector (0,0) determines cropping at (50,50) and ending of cropping at (1050, 550). And, if the motion vector (10,10), a map is made to (60,60) and, e.g., a motion vector of (−10,−10) maps to (40,40). The motion vector is generated at the signal processor, i.e., by the frame cropper controller functionality of the processor provides a cropping window. Through operation of the exemplary implementation, upon indication of a high sensor gain indication, indicative of a low-light lighting condition, the motion vector is gradually repositioned.

Figure 3:
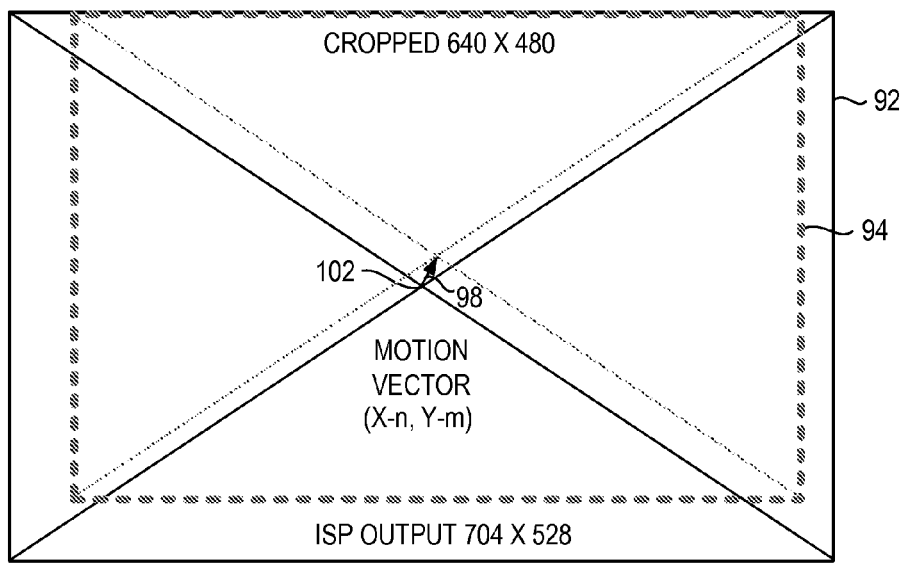
FIG. 3 illustrates a representation, similar to that shown in FIG. 2, but of an intermediate motion vector, and associated captured and cropped image frames pursuant to operation of an implementation of the present disclosure.

FIG. 3 illustrates again the captured image frame 92 and cropped image frame 94, characteristics of which are determined by the motion vector 98. In FIG. 3, the motion vector has values (x-n, y-m) rather than the value (x,y) of the motion vector shown in the example of FIG. 2.

Figure 4:
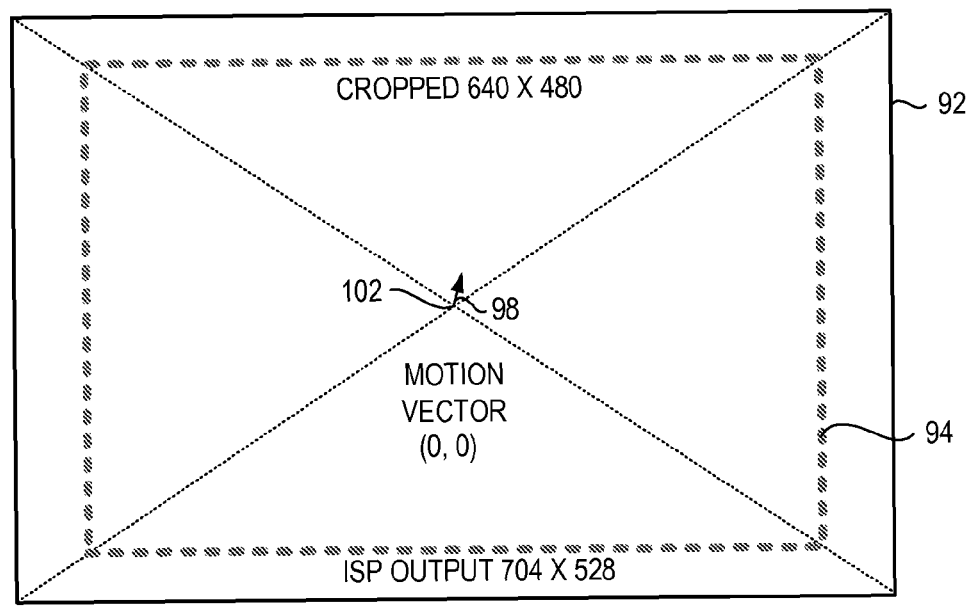
FIG. 4 illustrates a representation, similar to those shown in FIGS. 2-3, but of a selected motion vector, selected in response to a low-light, lighting condition, and associated captured and cropped image frames.

FIG. 4 again illustrates the captured image frame 92 and cropped frame 94. In this representation, the motion vector has a (0,0) value, and the dimensions of the cropped vector correspond to the dimensions of the captured image frame.

In one implementation, there are multiple intermediate, motion vectors to smooth the gradation between the motion vector utilized in acceptable lighting conditions and the reduced-value or null-valued motion vector used upon detection of a low-light, lighting condition.

Figure 5:
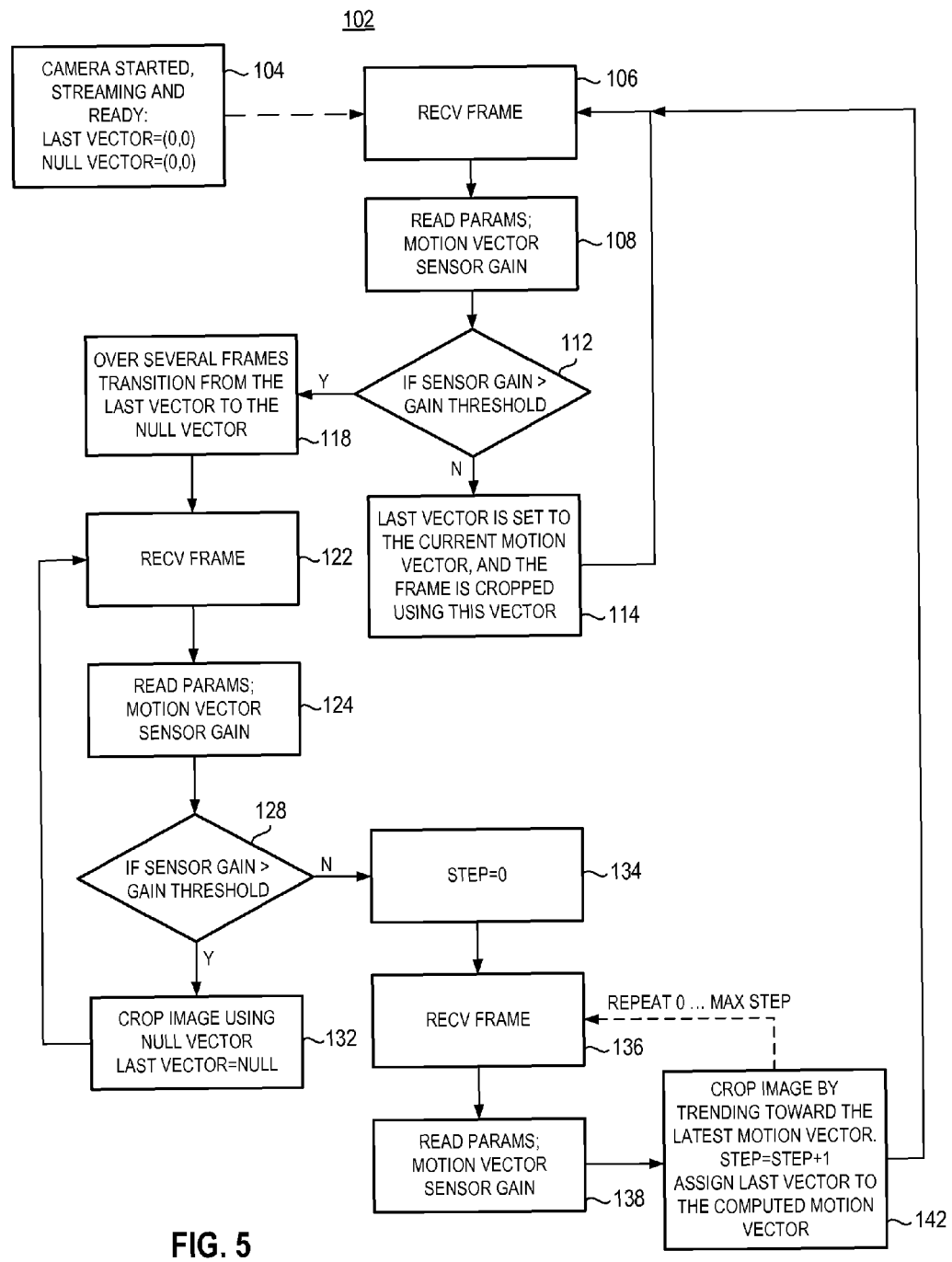
FIG. 5 illustrates a process diagram representative of the process of operation of an implementation of the present disclosure.

FIG. 5 illustrates a process 102 representative of the process of operation of an implementation of the present disclosure. The process provides for control over cropping of image frames of a video sequence.

Initialization is indicated at the block 104 in which vector values are initialized and recording commences. As indicated by the block 106, a captured image frame is received. Then, and as indicated by the block 108, parameters associated with the captured image frame are read or obtained. Here, a motion vector associated with the captured image frame is obtained, and a sensor gain is read or otherwise obtained.

At the decision block 112, a determination is made as to whether the sensor gain is greater than a threshold. If not, the no branch is taken to the block 114, and cropping operations are performed utilizing the indicated motion vector. A low sensor gain is indicative, e.g., of an acceptable lighting condition. That is to say, the prior vector is set to the current motion vector, and the frame is cropped using the motion vector. A path is taken back to the block 106 and a subsequent captured image frame is received.

If, conversely, a determination is made at the decision block 112 that the sensor gain is at least as great as the threshold, the yes branch is taken to the block 118. A high sensor gain is indicative of a low-light lighting condition. At the block 118, here, a transition is made from the motion vector read or obtained in the block 108 to a null or other reduced, vector. In the exemplary implementation, the transition occurs over several frames. And, if, during the transition, the sensor gain falls below the threshold, operation reverts to that of block 114.

Here, upon completion of the transition, the motion is set at the null, or other reduced, value.

Then, and as indicated by the block 122, a subsequent frame is received. And, as indicated by the block 124, parameter associated with the frame are read or otherwise obtained.

Then, and as indicated by the block 128, a determination is made as to whether the sensor gain is greater than a gain threshold. If so, the yes branch is taken to the block 132, and image cropping is performed using the null, or reduced value. And, a branch is taken back to the block 122.

If, conversely, the sensor gain is determined at the decision block 128 not to be greater than the gain threshold, the no branch is taken to the block 134. Then, at the block 136, a subsequent captured image frame is received. And, as indicated by the block 138, parameter associated with the received frame are read or otherwise obtained. The motion vector associated with the frame forms the new motion vector value that, presumptively, is not of the null or reduced value. In the exemplary implementation, transition is also performed gradually over several image frames, as indicated by the block 142, to alter the cropping gradually over several image frames from the null or reduced value to the new motion vector value. Then, a branch is taken to the block 106.

Figure 6:
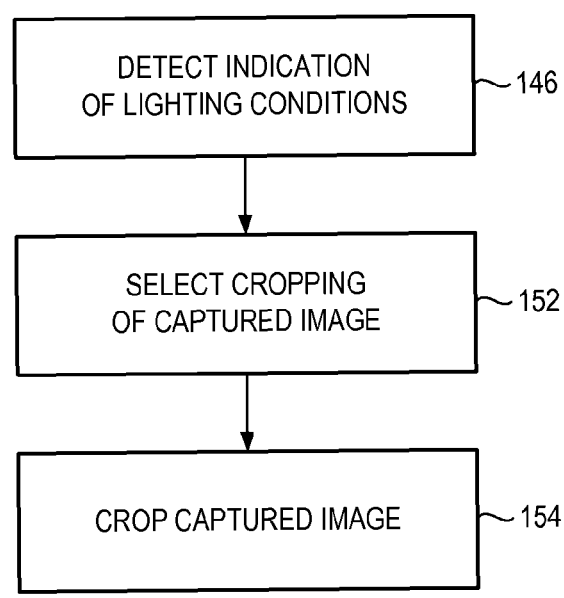
FIG. 6 illustrates a method diagram representative of the method of operation of an implementation of the present disclosure.

FIG. 6 illustrates a method 144 representative of the method of operation of an implementation of the present disclosure. The method facilitates formation of a video sequence formed of a plurality of captured image frames.

First, and as indicated by the block 146, detection is made of an indication of the lighting conditions associated with the captured image frame. Then, and as indicated by the block 152, cropping of a captured image frame is selected. The cropping selection is dependent upon the lighting conditions associated with the captured image frame. Then, and as indicated by the block 154, the captured image is cropped in a manner to conform to the selected cropping.

Thereby, a manner is provided by which better to provide for image stabilization of a recorded video susceptible to recordation in low-light, lighting conditions.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. A method for facilitating formation of a video sequence formed of a plurality of captured image frames, said method comprising:
    selecting cropping of a captured image frame of the plurality of captured image frames, cropping selection dependent upon a gain indicia detected with respect to the captured image frame, said selecting comprising generating a motion vector of a value determinative of cropping of the captured image and dependent upon the gain indicia associated with the captured image; and
    cropping the captured image in a manner conforming to the cropping selected during said selecting, wherein the gain indicia is indicative of low-light lighting conditions and the cropping selected during said selection is operative to change an initial value of the motion vector to a selected value indicative of low-light lighting conditions in a multi-step change using at lease one intermediate motion vector.

2. The method of claim 1 wherein said selecting further comprises generating a plurality of motion vectors of values between the initial value and the selected value.

3. The method of claim 2 wherein said cropping the captured image comprises cropping successive captured images of the plurality of captured images, each successive one of the captured images using a corresponding one of the plurality of the motion vectors.

4. An apparatus for facilitating formation of a video sequence formed of a plurality captured image frames, said apparatus comprising:
    an image frame cropper configured to crop a perimeter portion of a captured image frame of the plurality of captured image frames to form a cropped image frame; and
    a controller configured to control cropping of the captured image frame by said image frame cropper, cropping of the captured image frame dependent upon a gain indicia associated with the captured image frame, wherein said controller is operative to generate a motion vector of a value determinative of cropping of the perimeter portion of the captured image, said value being dependent upon the gain indicia associated with the captured image frame, and further wherein when the gain indicia is of low-light lighting conditions, said controller is configured to change the value of the motion vector from an initial value to a selected value indicative of low-light conditions in a multi-step change using at least one intermediate motion vector.

5. The apparatus of claim 4 wherein said controller is configured to receive an indication of the gain indicia associated with the captured image frame.

6. The apparatus of claim 4 wherein said image frame cropper is configured to crop each captured image frame of the plurality of captured images.

7. The method of claim 6 wherein said controller is configured to control cropping of each of the plurality of captured images, the cropping of the plurality dependent upon the lighting conditions associated with at least one captured image frame of the plurality.

8. The apparatus of claim 7 wherein the cropping of the plurality of captured images frames is dependent upon the lighting conditions associated with at least selected ones of the captured images forms of the plurality.

9. The apparatus of claim 4 wherein the number of steps in the multi-step change is dependent upon a difference between the initial value and the selected value.

10. The apparatus of claim 4 wherein the captured image frame comprises a camera-provided captured image frame and wherein said controller is configured to control the cropping dependent upon a camera-provided gain indicia.

11. A non-transitory tangible computer-readable medium containing program instructions stored thereon which facilitate image cropping by a camera apparatus when executed by one or more processors associated therewith, the non-transitory tangible computer-readable medium comprising:

a code portion for facilitating selection of cropping of a captured image frame of the plurality of captured image frames, cropping selection dependent upon a gain indicia detected with respect to the captured image frame, said selecting comprising generating a motion vector of a value determinative of cropping of the captured image and dependent upon the gain indicia associated with the captured image; and a code portion for cropping the captured image in a manner conforming to the cropping selected during said selecting, wherein the gain indicia is indicative of low-light lighting conditions and the cropping selected during said selection is operative to change an initial value of the motion vector to a selected value indicative of low-light lighting conditions in a multi-step change using at lease one intermediate motion vector.

* * * * *